(12) United States Patent
Bransford

(10) Patent No.: US 10,343,275 B2
(45) Date of Patent: Jul. 9, 2019

(54) PANEL CARRIER

(71) Applicant: Russell Bransford, Camden, SC (US)

(72) Inventor: Russell Bransford, Camden, SC (US)

(73) Assignee: Affinity Tool Works, LLC, Troy, MI (US)

( * ) Notice: Subject to any disclaimer, the term of this patent is extended or adjusted under 35 U.S.C. 154(b) by 145 days.

(21) Appl. No.: 14/541,566

(22) Filed: Nov. 14, 2014

(65) Prior Publication Data

US 2015/0137439 A1  May 21, 2015

Related U.S. Application Data

(60) Provisional application No. 61/904,585, filed on Nov. 15, 2013.

(51) Int. Cl.
| | |
|---|---|
| *B25H 1/04* | (2006.01) |
| *B25H 1/16* | (2006.01) |
| *B65G 7/12* | (2006.01) |
| *B23D 59/00* | (2006.01) |

(52) U.S. Cl.
CPC ............... *B25H 1/16* (2013.01); *B23D 59/00* (2013.01); *B25H 1/04* (2013.01)

(58) Field of Classification Search
CPC ............. B25H 1/16; B25H 1/04; B23D 59/00
USPC .................................... 248/185.1; 144/286.5
See application file for complete search history.

(56) References Cited

U.S. PATENT DOCUMENTS

| | | | | |
|---|---|---|---|---|
| 1,203,783 A | * | 11/1916 | Reischmann | A47B 3/0815 108/132 |
| 1,627,454 A | * | 5/1927 | Phalon | A47B 13/14 108/129 |
| 2,693,635 A | * | 11/1954 | Chapman | A01G 5/02 108/8 |
| 3,147,748 A | * | 9/1964 | Frank | A47J 37/0763 108/119 |
| 3,598,390 A | * | 8/1971 | Armitage | B25H 1/00 118/503 |
| 3,640,228 A | * | 2/1972 | Busse | A47B 9/20 108/10 |
| 3,698,577 A | * | 10/1972 | Dean | B65G 49/062 280/79.3 |
| 3,729,209 A | * | 4/1973 | Litz | B62B 3/02 280/47.2 |
| 3,828,942 A | * | 8/1974 | Young | B66F 19/00 254/4 R |

(Continued)

FOREIGN PATENT DOCUMENTS

EP 2400079 A1 12/2011

*Primary Examiner* — Joseph J Hail
*Assistant Examiner* — Arman Milanian
(74) *Attorney, Agent, or Firm* — William H. Honaker; Dickinson Wright PLLC

(57) ABSTRACT

The present invention is panel carrier for transporting and supporting a panel. The panel carrier includes a frame and a support leg pivotally mounted to the frame. The leg is pivotal between a transport position and a working position. A support surface is provided and is pivotally mounted to the frame. The support surface is pivotal between a transport position and a working position. A panel can be positioned upon the support surface when the support surface and the support leg are in the transport position and thereafter, the support surface and the support leg can be pivoted to the working position to support the panel generally perpendicular to the frame.

15 Claims, 9 Drawing Sheets

(56) References Cited

U.S. PATENT DOCUMENTS

| | | | | |
|---|---|---|---|---|
| 3,923,167 | A * | 12/1975 | Blankenbeckler | B25H 1/00 414/11 |
| 4,278,244 | A * | 7/1981 | Carter | B25B 5/142 269/152 |
| 4,488,733 | A * | 12/1984 | Hellsten | B62B 3/009 280/47.16 |
| 4,611,823 | A * | 9/1986 | Haas | F16M 11/42 108/119 |
| 4,838,181 | A * | 6/1989 | Luyk | A47B 13/021 108/131 |
| 4,879,954 | A * | 11/1989 | Sawamura | A47B 3/00 108/6 |
| 4,967,672 | A * | 11/1990 | Leather | A47B 3/02 108/120 |
| RE33,645 | E * | 7/1991 | Coote | B25H 5/00 211/70.6 |
| 5,087,013 | A * | 2/1992 | Gress | B23Q 9/00 248/129 |
| 5,120,072 | A | 6/1992 | Laramie | |
| 5,219,142 | A * | 6/1993 | Potter | A47B 97/08 248/163.1 |
| 5,762,348 | A | 6/1998 | Echternacht | |
| 5,988,659 | A * | 11/1999 | Young | B62B 3/108 280/63 |
| 6,095,319 | A * | 8/2000 | Noniewicz | B23D 47/025 198/632 |
| 6,179,116 | B1 * | 1/2001 | Noniewicz | B25H 1/00 198/632 |
| 6,241,447 | B1 | 6/2001 | Echternacht | |
| D448,948 | S * | 10/2001 | Wolff | D6/684 |
| 6,663,123 | B1 | 12/2003 | Kovacs | |
| 6,739,819 | B2 | 5/2004 | Caudill et al. | |
| 6,857,836 | B2 | 2/2005 | Keller | |
| 6,886,836 | B1 * | 5/2005 | Wise | B25H 1/04 280/30 |
| D523,041 | S * | 6/2006 | Wise | D15/141 |
| 7,059,616 | B2 * | 6/2006 | Wu | B25H 1/04 108/117 |
| 7,090,210 | B2 * | 8/2006 | Lawrence | B25H 1/04 269/139 |
| 7,182,302 | B2 * | 2/2007 | Noniewicz | B25H 1/04 108/116 |
| 7,341,006 | B2 * | 3/2008 | Hernandez | A47B 3/0815 108/115 |
| D566,735 | S * | 4/2008 | Wise | D15/141 |
| 7,628,408 | B2 | 12/2009 | Kolesa et al. | |
| 7,631,604 | B2 * | 12/2009 | Huang | A47B 3/08 108/115 |
| 7,681,893 | B2 * | 3/2010 | Liu | B25H 1/04 280/35 |
| 7,836,833 | B2 * | 11/2010 | Kumazawa | A47B 3/0815 108/115 |
| 8,104,787 | B2 * | 1/2012 | Haley | B62B 3/108 108/115 |
| 8,109,526 | B2 | 2/2012 | Mason et al. | |
| 8,342,464 | B2 * | 1/2013 | Reinke | A47B 19/06 248/163.1 |
| 8,413,594 | B2 * | 4/2013 | Ensley | A47B 3/0815 108/132 |
| 8,448,956 | B2 * | 5/2013 | Wise | B25H 1/04 280/30 |
| 8,480,058 | B2 * | 7/2013 | Matthews | E04F 21/1894 254/120 |
| 8,646,731 | B2 * | 2/2014 | Burles | F16L 3/16 144/287 |
| 8,708,350 | B2 * | 4/2014 | Bottazzi | B62B 1/002 280/35 |
| D721,108 | S * | 1/2015 | Wise | D15/141 |
| 8,950,343 | B2 * | 2/2015 | Huang | A47B 9/16 108/116 |
| 2003/0127834 | A1 * | 7/2003 | Click | B62B 3/108 280/651 |
| 2003/0167980 | A1 * | 9/2003 | Suzuki | A47B 3/0815 108/129 |
| 2006/0071450 | A1 * | 4/2006 | Wu | B25H 1/04 280/642 |
| 2006/0075943 | A1 * | 4/2006 | Chen | F16M 3/00 108/115 |
| 2006/0145045 | A1 * | 7/2006 | Chisholm | B25H 1/04 248/439 |
| 2008/0115701 | A1 * | 5/2008 | Sugiura | B25H 1/16 108/132 |
| 2008/0257225 | A1 * | 10/2008 | Chianale | A47B 3/10 108/11 |
| 2010/0096530 | A1 * | 4/2010 | Chiu | B25H 1/04 248/439 |
| 2012/0085268 | A1 * | 4/2012 | Straface | B25H 1/04 108/25 |
| 2012/0280191 | A1 | 11/2012 | Siebelink | |

* cited by examiner

PANEL CARRIER

RELATED APPLICATIONS

This application claims the benefit of U.S. Provisional Application No. 61/904,585 filed on Nov. 15, 2013.

STATEMENT REGARDING FEDERALLY SPONSORED RESEARCH

None.

TECHNICAL FIELD

This invention relates generally to the woodworking and construction industry and more particularly to an inexpensive, compact carrier to carry and support large panels of material such as for example, sheets of plywood, particle board, drywall, etc. so that they can be moved with minimal effort and supported for processing functions, such as for example cutting, ripping, drilling, nailing etc.

BACKGROUND OF THE INVENTION

Large sheets of material, such as plywood, sheet rock, gypsum board, flooring, glass, mirrors, etc. are regularly used in all types of construction. These sheets are bulky and heavy, making them difficult to handle. Plywood for example is typically sold in 4 by 8 foot sheets and can have various thicknesses such as for example ¼", ⅜", ½", ⅝", ¾" and 1". Depending upon the thickness, a typical sheet of plywood can weigh from about 25 pounds to over 100 pounds.

As can be appreciated, the size and weight of these sheets make them very difficult to handle. Moving the panels from a workplace is difficult and typically requires two people. In some instances, when two people are not available, a handcart can be used or the panel is just wrestled into position. None of these are desirable alternatives.

Once in the working position, such as for example near a table saw, some type of stand is needed to support the panel so that it can be cut, ripped, routed, drilled, etc. For example, these stands may be sawhorses, roller stands, table saw extensions, etc. There are numerous such stands that are used and well known to those of ordinary skill in the art. Due to the bulk of the panel, it generally takes two people to place the panel on the stands, or one person to wrestle the panel onto the stand. Again, not a desired way of handling sheets of material

SUMMARY OF THE INVENTION

In general terms, this invention provides a panel carrier that can support a panel for transport to for example a work station, and when in place, be pivoted to support the panel in either a vertical position or horizontal position for further work. The panel carrier allows a single person to easily pick up and move a panel and then position and hold the panel as the user works with the panel.

The panel carrier of the present invention has a frame with wheels attached and a support leg pivotally mounted to the frame. The support leg can be pivoted between a transport position and a working position, with the leg being generally adjacent the frame in the transport position and angled with respect to the frame in the working position. As will be appreciated, in the transport position, the wheels allow the frame to be moved about. When in position, the leg can be extended to form a support base to hold the frame in position.

A panel support surface is pivotally mounted to the frame. The panel support surface can be pivoted between a vertical transport position and a horizontal working position. It will also be understood by those of ordinary skill in the art that the panel in the vertical transport position could also be a working position if desired. The support surface is generally adjacent the frame in the transport position and generally perpendicular to the frame in said working position. But, if desired, the panel could be worked on in the vertical position as well, depending on the process being performed on the panel.

The panel can be positioned on the support surface when the support surface and the support leg are in the transport position. In this position, the support surface and the support leg are generally vertical and adjacent the frame. Once transported, the support surface and the support leg can be pivoted to a working position to support the panel in a horizontal position that is generally perpendicular to said frame with the leg being angled with respect to the fame to hold it in place.

An adjustable support member is also provided to interconnect the support surface to the frame. This adjustable support member allows the support surface to be adjusted with respect the fame to enable the height of the panel in the working position to be adjusted to a desired height.

These and other features and advantages of this invention will become more apparent to those skilled in the art from the detailed description of a preferred embodiment. The drawings that accompany the detailed description are described below.

DETAILED DESCRIPTION OF A PREFERRED EMBODIMENT

Figure 1:
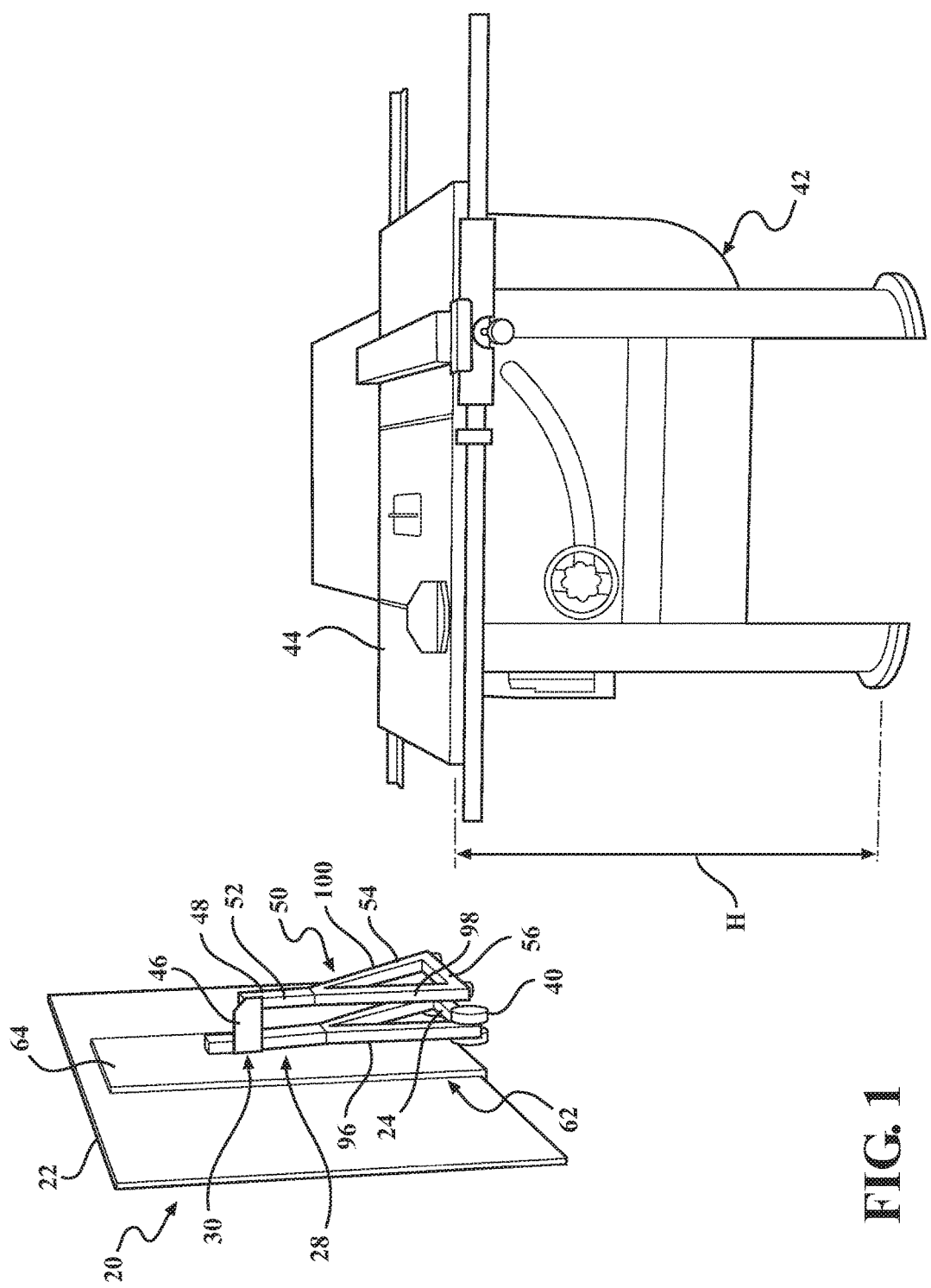
FIG. 1 is a perspective view of a first embodiment of the present invention in the transport position.

Referring to the Figures, wherein like numerals indicate corresponding parts throughout the several views, a panel carrier apparatus 20 for moving a panel 22 along a surface is generally shown in FIGS. 1 through 6.

The apparatus 20 includes a base 24 extending between a pair of base ends 26 and a frame 28, as generally indicated. The base 24, the base ends 26 and the frame 28 as illustrated are made of rectangular shaped tubing, but it will be understood by those of ordinary skill in the art that the tubing could be circular in cross section, triangular, etc., and hollow or solid.

Figure 7:
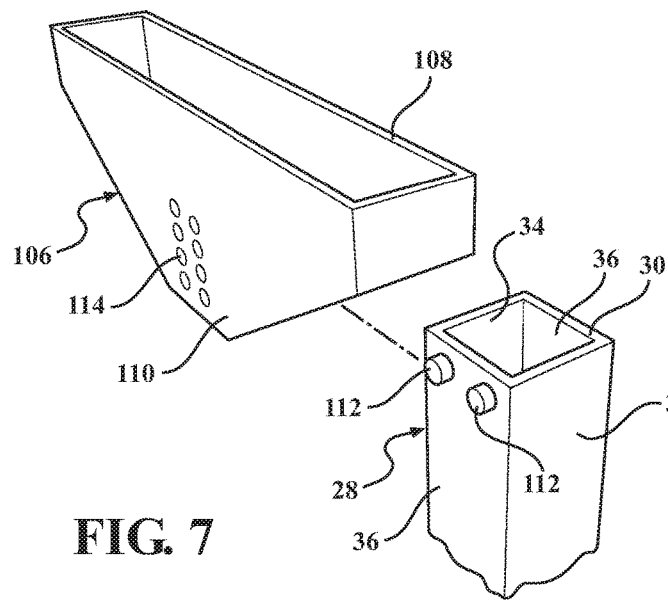
FIG. 7 is a perspective of the block body of the present invention.

The frame 28 extends outwardly from the base 24 to an apex 30. With reference to FIG. 7, the frame 28 has a front face 32 and a back face 34 and a pair of side faces 36. A support rod or arm 38 having a rectangular shape as illustrated is mounted within the frame 28. A pair of wheels 40 are mounted at each of the base ends 26 of the base 24 for moving the frame 28 along a surface to for example a machine 42 having a work surface 44, such as a table saw, disposed at a predetermined height H from the ground.

The frame 28 has an intermediate member 46 extending outwardly from the apex 30 at a predetermined angle α to a joint end 48. A support leg 50, as generally indicated, is attached to frame 28 and extends between an upper end 52 and a lower end 54. The lower end 54 of the support leg 50 is attached to a bottom portion 56 extending between a first end 58 and a second end 60. As shown in FIGS. 1 through 6, the upper end 52 of the support leg 50 is pivotably connected, by a fastener, e.g. a bolt, to the intermediate member 46 at the joint end 48 for allowing the support leg 50 to move between a first position of being parallel to the frame 28 and a second position of being spaced apart from the frame 28 extending outwardly from the intermediate member 46 of the frame 28 at the predetermined angle α for supporting the frame 28.

Figure 2:
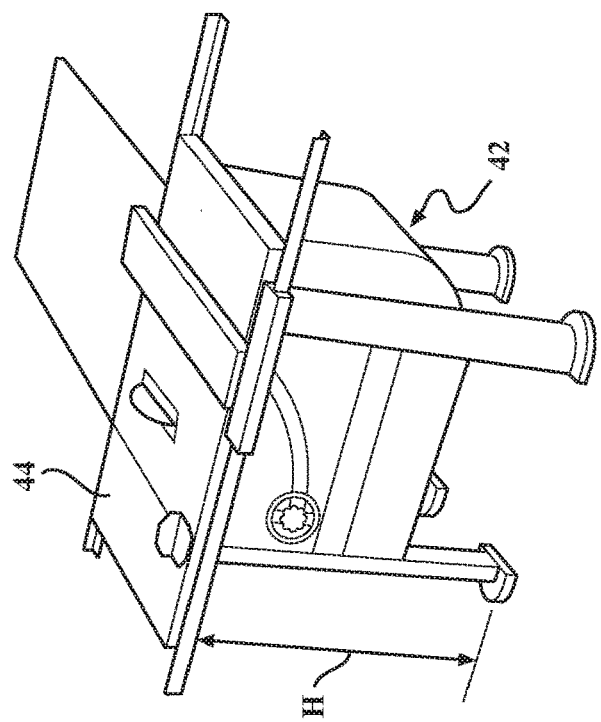
FIG. 2 is a further perspective view of a first embodiment of the present invention in the transport position.
Figure 2:
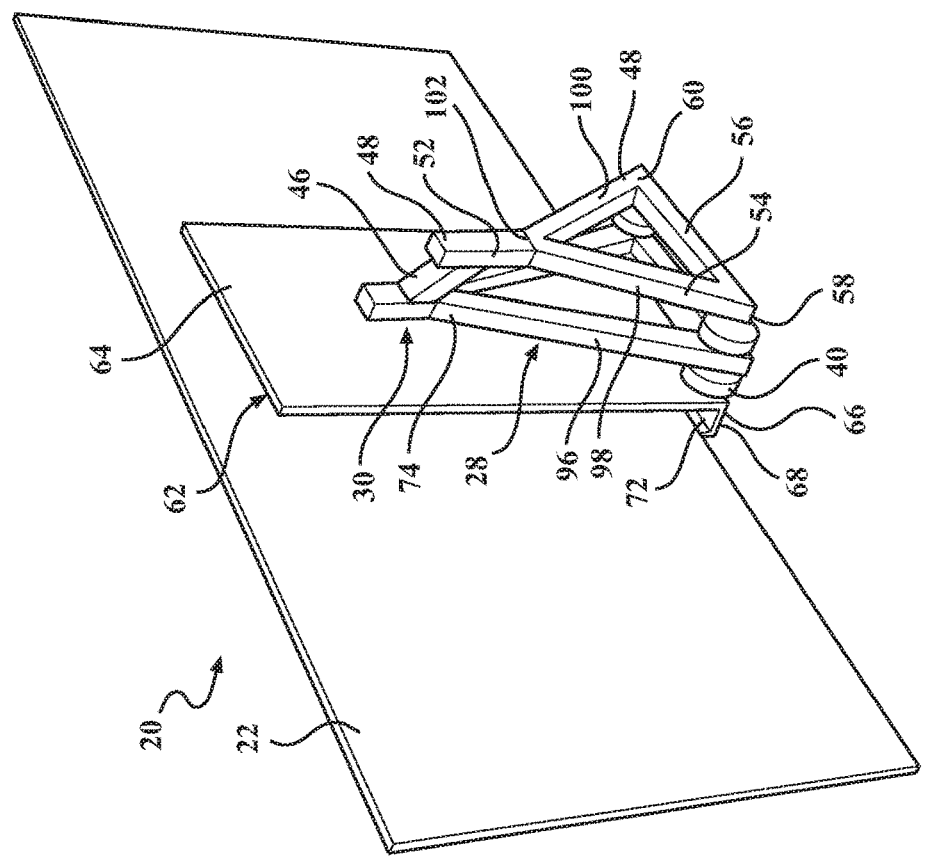

A rack assembly 62, as generally indicated, is attached to the apex 30 of the frame 28 for carrying the panel 22. The rack assembly 62 includes a support surface 64 having a generally rectangular shape as illustrated which is pivotably attached to the apex 30 of the frame 28 to allow the support surface 64 to move between a transporting position and a working position. In the transporting position, as shown in FIGS. 1 and 2, the support surface 64 is disposed generally parallel to the frame 28. In the working position, the support surface 64 is disposed generally horizontal, or as illustrated coplanar to the cutting platform 44 of the machine 42 to allow a user to slide the panel 22 from the support surface 64 to the cutting platform 44 of the machine 42.

The support surface 64 has a support ledge 66 extending outwardly and perpendicularly from the support surface 64 to a distal end 68. A lip 70 extends outwardly and perpendicularly from the distal end 68, spaced apart from the support surface 64, and generally parallel to the support surface 64 to define a pocket 72 for receiving the panel 22.

Figure 4:
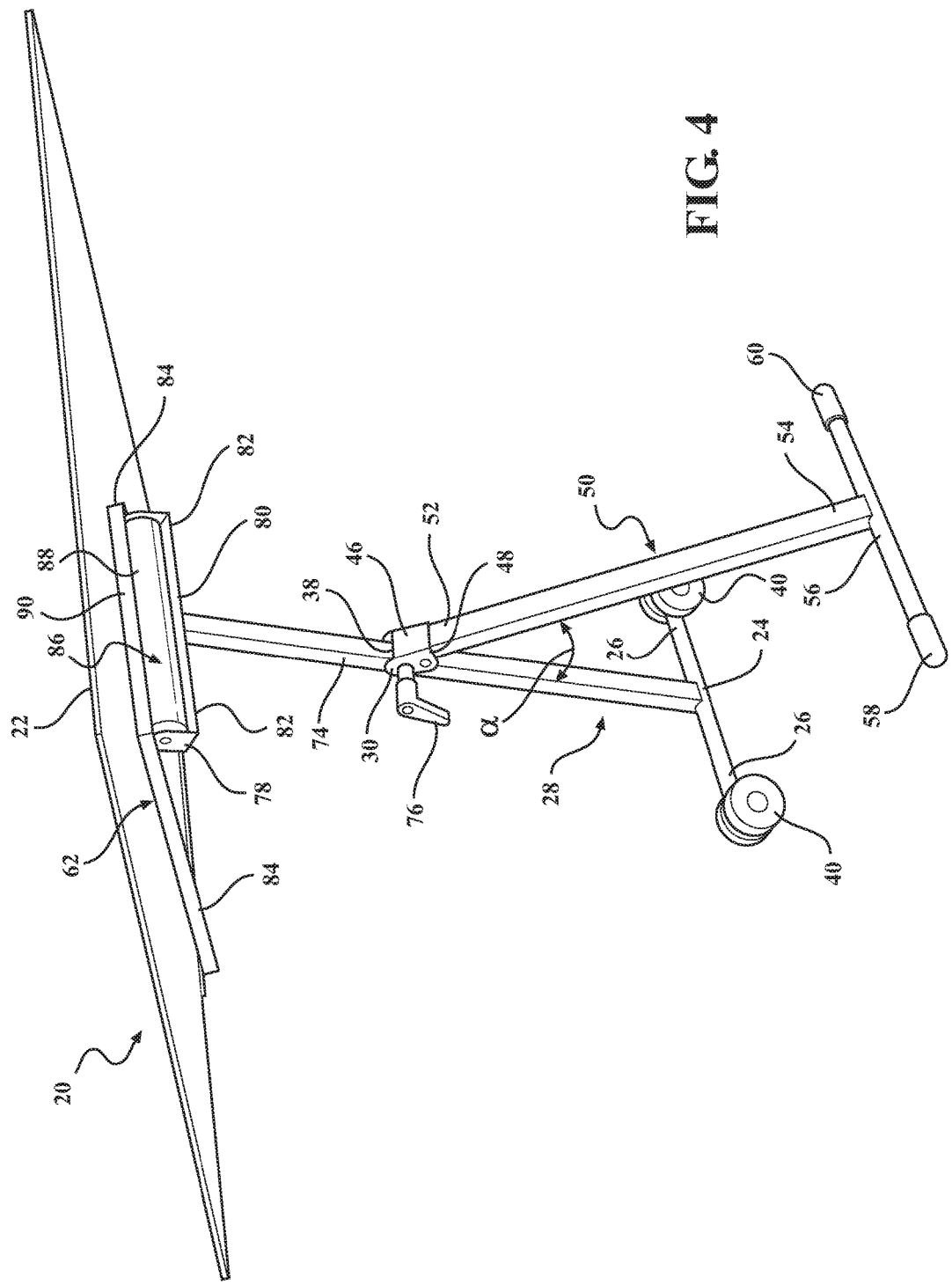
FIG. 4 is a perspective view of a second embodiment of the present invention in the working position.
Figure 5:
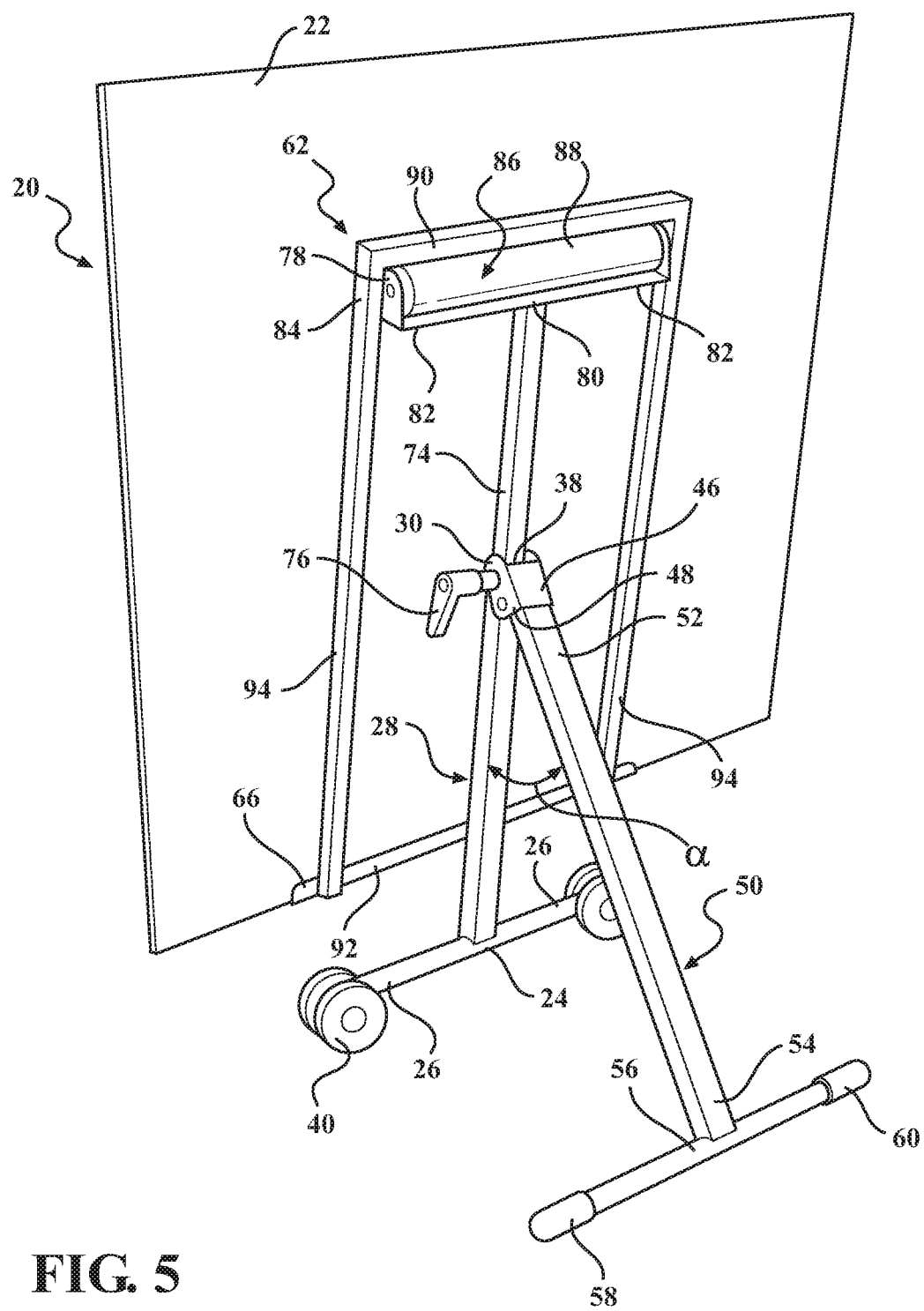
FIG. 5 is a perspective view of the second embodiment of the present invention in the transport position.
Figure 6:
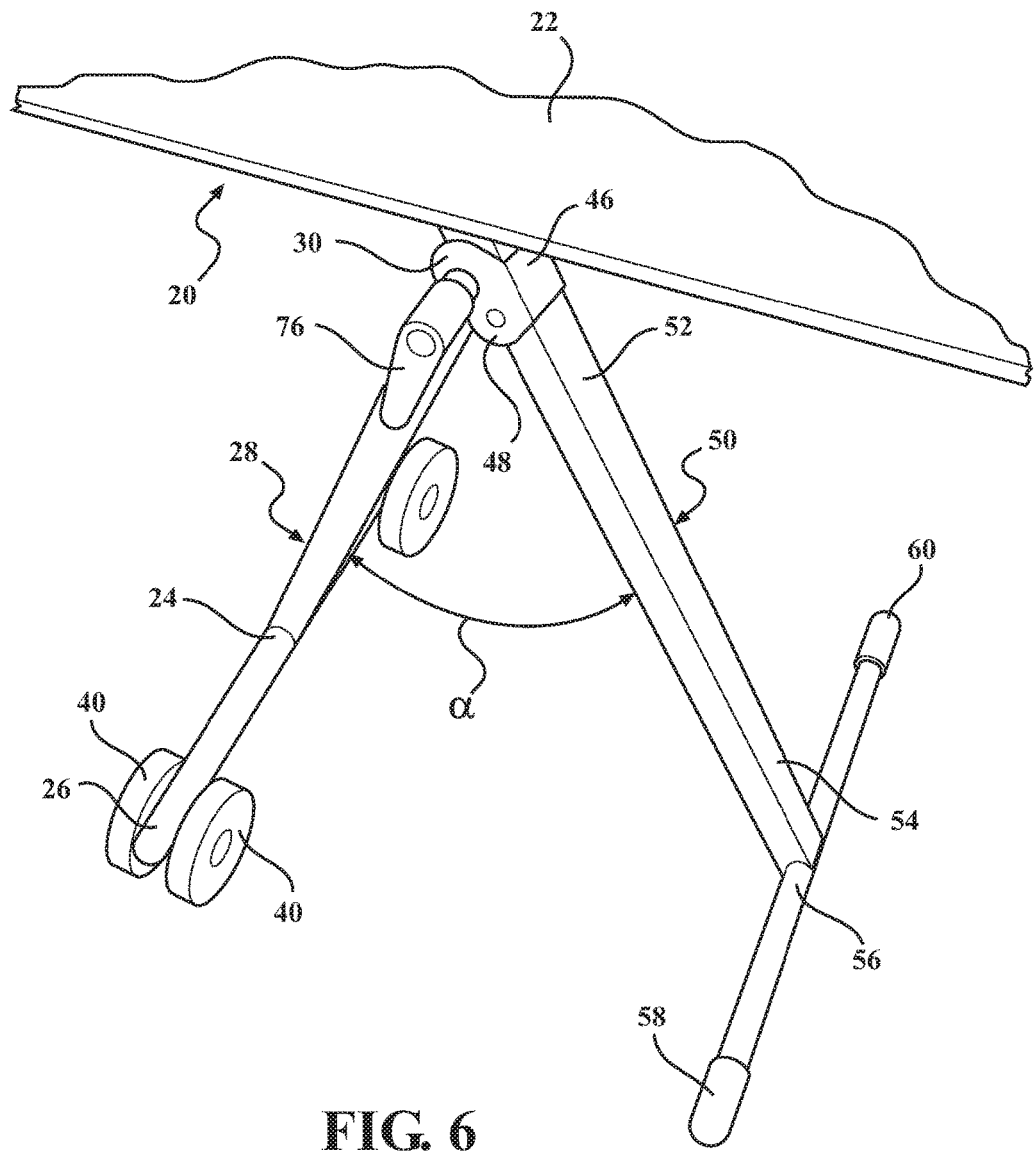
FIG. 6 is a perspective view of the frame and support leg in the working position.

With reference to FIGS. 4 through 6, a telescopic tube 74 slides in the opening 38 of the frame 28 interconnecting the frame 28 with the rack assembly 62 for allowing a user to slide the rack assembly 62 to a height equal to the predetermined height H of the cutting platform 44. The frame 28 also includes an adjustment knob 76 having a fastener, e.g. a bolt, disposed adjacent to the apex 30 of the frame 28 for allowing the user to adjust the rack assembly 62 to the predetermined height H of the cutting platform 44. In other words, in response to moving the adjustment knob 76, the fastener is also moved and pressed against the telescopic tube 74 to bias the telescopic tube 74 against the frame 28 to secure the rack assembly 62 to the frame 28 at the height that is the same as the predetermined height of the cutting platform 44.

The rack assembly 62 of the apparatus 20 includes a mounting bracket 78, as generally indicated, having a U-shape as illustrated. The mounting bracket 78 has a main portion 80 extending between a pair of bracket ends 82. The mounting bracket 78 is attached to the telescopic tube 74 and then to the apex 30 of the frame 28 in a perpendicular relationship with the frame 28. The mounting bracket 78 also includes an arm 84 extending outwardly from each of the bracket ends 82 of the main portion 80 parallel to one another and perpendicular to the main portion 80 defining a mounting space 86 extending between the arm 84 and the main portion 80. The rack assembly 62 further includes a shaft 88 having a cylindrical shape as illustrated which is disposed in the mounting space 86 extending between the arm 84 of the mounting bracket 78 and rotatably attached to the arm 84 of the mounting bracket 78 by using a fastener, e.g. a bolt.

As shown in FIG. 5, the support surface 64 includes a pair of beams 90, 92 having a first beam 90 and a second beam 92 spaced apart from one another in a generally parallel relationship. Connecting members 94 are spaced apart from one another and extend generally perpendicular to one another between the first beam 90 and the second beam 92 interconnecting the first beam 90 with the second beam 92. The first beam 90 is attached to the shaft 88 allowing the shaft 88 to rotate the table 64 between the transporting position and the working position. The support ledge 66 extends outwardly and generally perpendicular to the second beam 92.

Figure 3:
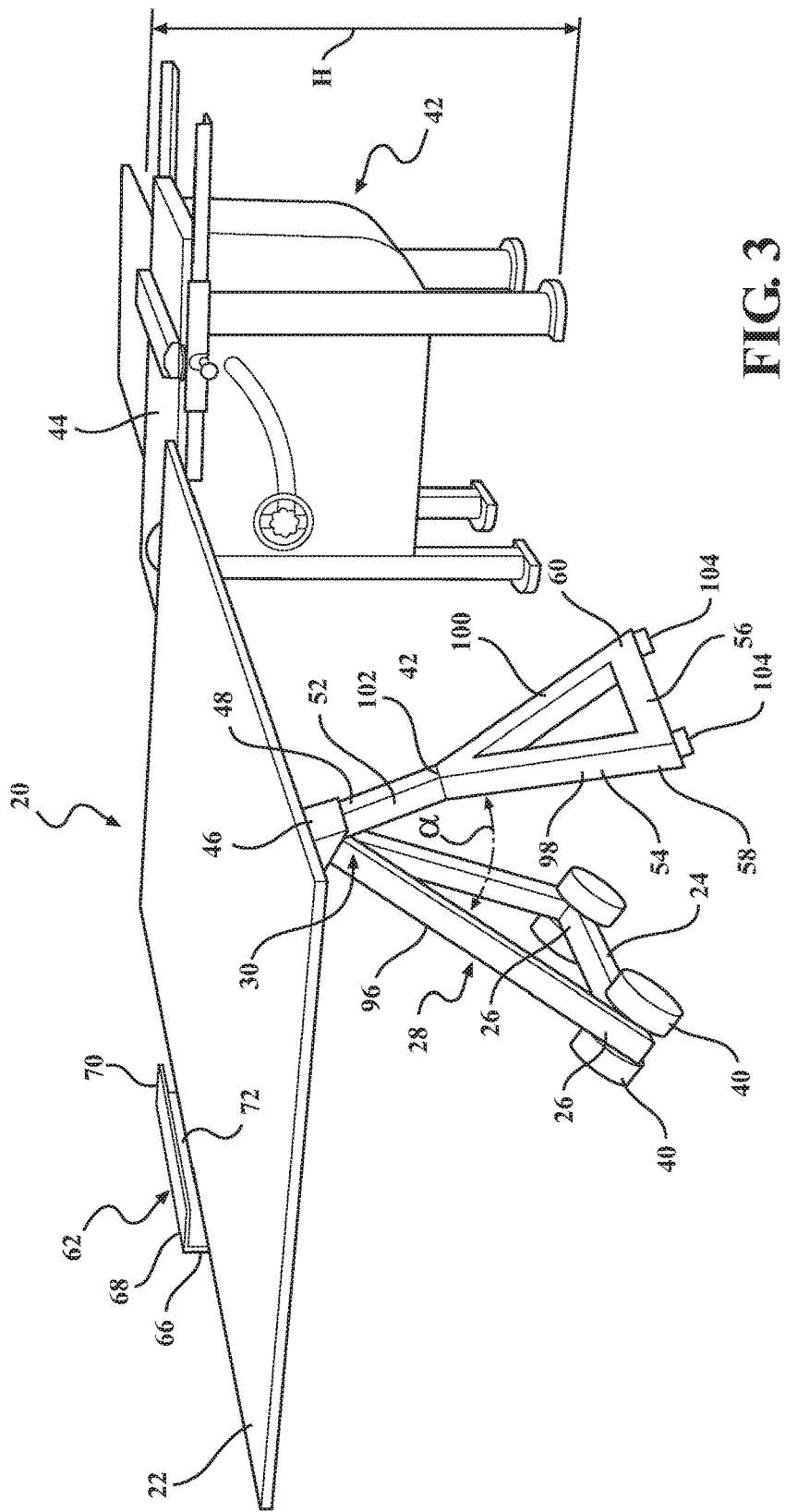
FIG. 3 is a perspective view of the first embodiment of the present invention in the working position.

With reference to FIGS. 1 through 3, The frame 28 has a triangular shape as illustrated which includes a side member 96 extending outwardly from each of the base ends 26 of the base 24 and converging to the apex 30. The support leg 50 has a triangular shape as illustrated. Support leg 50 includes a first rail 98 extending outwardly from the first end 58 of the bottom portion 56. The support leg 50 further includes a second rail 100 extending outwardly from the second end 60 of the bottom portion 56 and converging to a top 102. The support leg is attached to pivot with respect to the frame 28 at the top 102 by a fastener, e.g. a pin, bearing or bolt. The first end 58 and the second end 60 of the bottom portion 56 of the support leg 50 each has a projection 104 extending outwardly from the bottom portion 56 and away from the first rail 98 and the second rail 100 for allowing the support leg 50 to support the frame 28.

Figure 8:
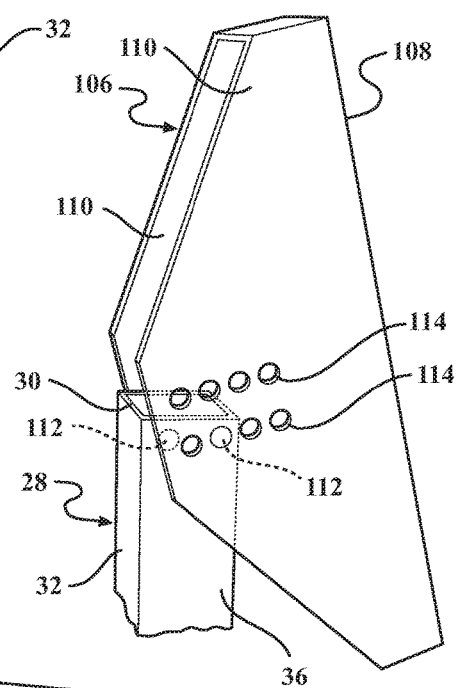
FIG. 8 is a further view of the block body of the present invention.
Figure 9:
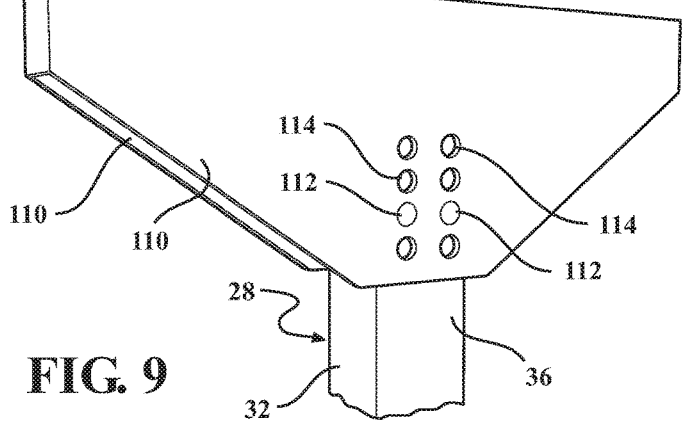
FIG. 9 is a still further view of the block body of the present invention.

With reference to FIGS. 7 through 9, a block body 106, is generally indicated. Block body 106 is disposed between the support surface 64 and the apex 30 of the frame 28 interconnecting the support surface 64 with the frame 28. The block body 106 includes a foundation end 108 having a rectangular shape as illustrated that is attached to the support surface 64. The block body 106 also includes a pair of sidewalls 110 each having a generally trapezoidal shape as illustrated (it will be understood by those of ordinary skill in the art that other shapes could be used, such as square, rectangular, etc.) which extend outwardly and generally perpendicular from the foundation end 108 and spaced apart from one another to sandwich the frame 28 between the sidewalls 110 to engage the frame 28. Each of the side faces 36 of the frame 28 includes a pair of pins 112 having a cylindrical shape as illustrated which is disposed adjacent to the apex 30 spaced apart from one another and extending outwardly and perpendicularly from the side face 36 for engaging the sidewalls 110. Each of the sidewalls 110 has a plurality of apertures 114 having a circular shape as illustrated for receiving the pins 112 to allow the table 64 to pivot about the apex 30 between the transporting position and the working position. As shown in FIG. 8, in order to allow the support surface 64 to pivot between the transporting position and the working position, only one of the pins 112 on each of the side faces 36 of the frame 28 engages one of the apertures 114 on the sidewalls 110. As shown in FIG. 9, when both pins 112 on each of the side faces 36 of the frame 28 engage the apertures 114 on the sidewalls 110, the block body 106 is secured to the frame 28 by the pins 112 in either the transporting position or the working position.

In use, the apparatus 20 can be used to carry the panel 22 of any size shape and material. For example, the apparatus 20 can be used to carry a panel 22 having a size of 24"×16" made of metallic material or a panel 22 having a size of 48"×36" made of wood material. When moving the panel 22, the support leg 50 can be folded in the first position parallel to the frame 28 and the table 64 can be folded in the transporting position to allow the user to move the panel 22 along the surface to the machine 42. Once the apparatus 20 is moved adjacent to the machine 42, the user can move the support leg 50 from the first position to the second position to support the frame 28 on the surface. Accordingly, the user can pivot the support surface 64 about the apex 30 from the transporting position to the working position. With the support surface 64 in the working position, the user can slide the panel 22 from the table 64 to the cutting platform 44 of the machine. It will also be understood that the panel can remain in the vertical position and worked on as well.

As shown in FIGS. 4 and 5, the telescopic tube 74 slides in the channel 38 of the frame 28 for allowing the user to adjust and align the support surface 64 at the predetermined height H from the surface. For example, once the table 64 and the cutting platform 44 of the machine 42 are properly aligned, the user can use the adjustment knob 76 to secure the telescopic tube 74 to the frame 28. Accordingly, the user can feed the panel 22 from the support surface 64 to the cutting platform 44 of the machine 42. It should be appreciated that the apparatus 20 can be used with other machines 42 such as, but not limited to a planer machine 42, a router, a drill stand, radial arm saw, etc.

Figure 10:
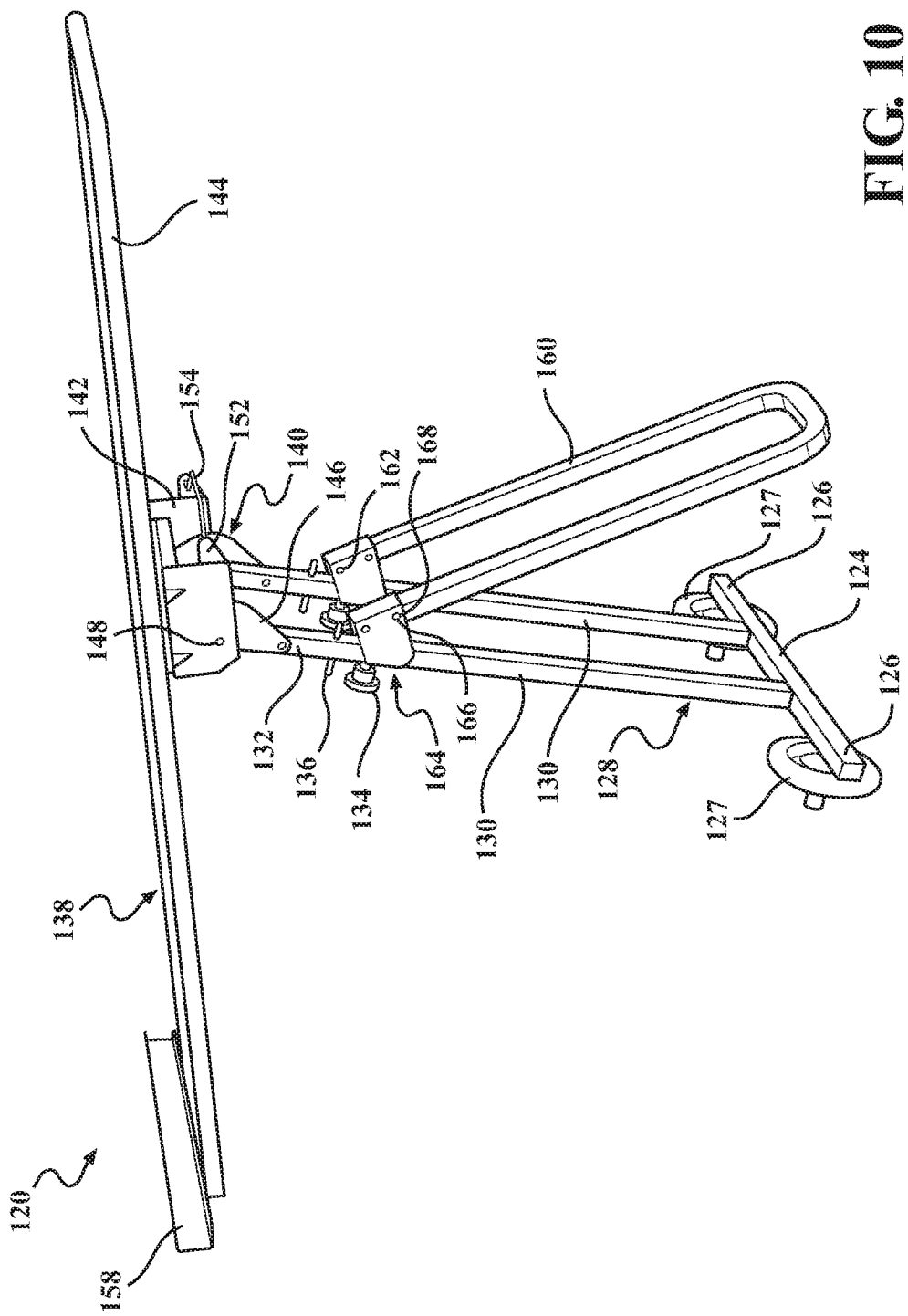
FIG. 10 is a perspective view of a still further embodiment of the panel carrier of the present invention in the working position.
Figure 11:
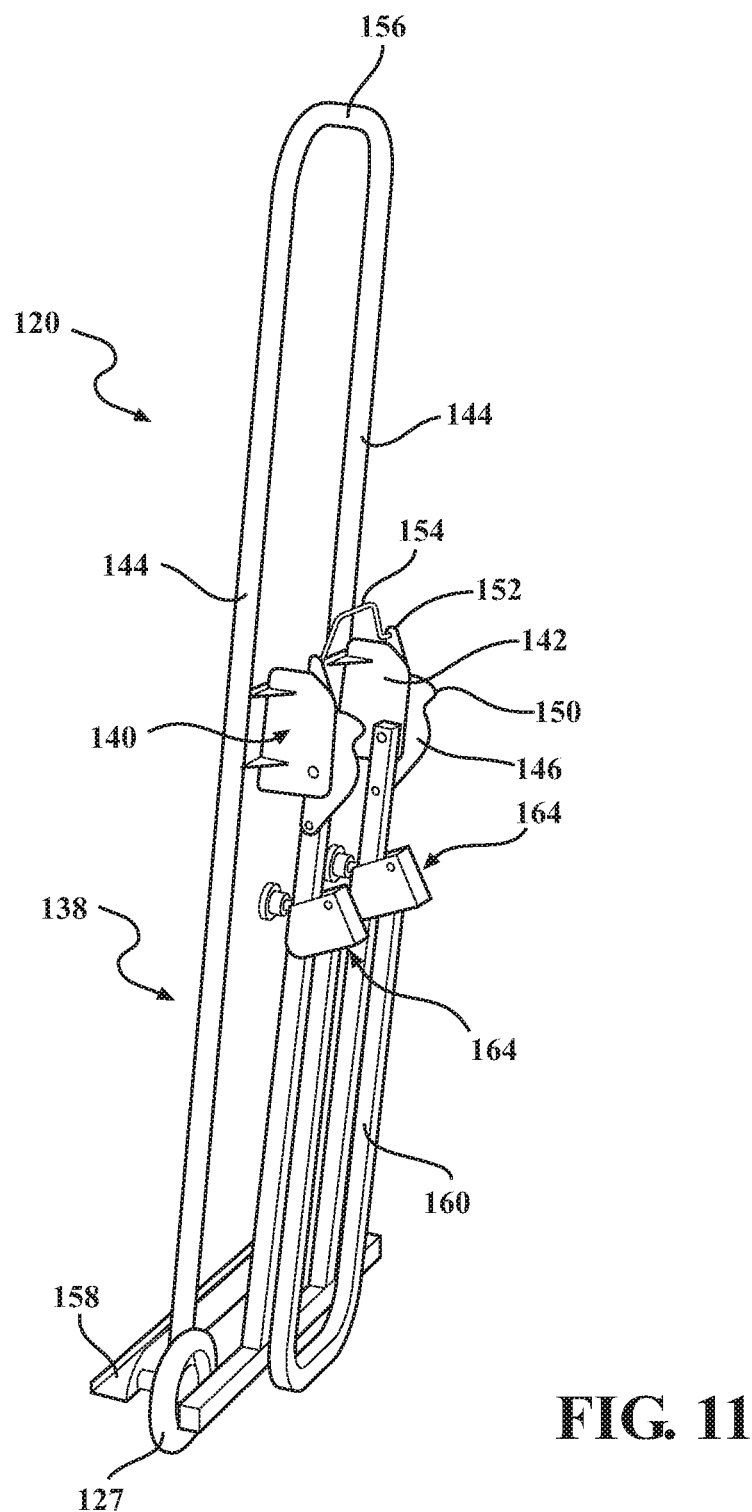
FIG. 11 is a perspective view of a still further embodiment of the panel carrier of the present invention in the transport position.

With reference to FIGS. 10 and 11, an alternative embodiment of the panel carrier of the present invention is shown generally at 120. The panel carrier 120 has a base 124 with base ends 126. Wheels 127 are mounted to the base ends 126 to allow for easy movement of the carrier. A frame 128 is mounted to the base 124. In this embodiment, the frame is generally rectangular in shape and defined by two spaced outwardly extending members 130. Support arms 132 telescope within the outwardly extending members 130 to allow for relative adjustment of the arms 132 with respect to the members 130. Locking knobs 134 lock the arms 132 with respect to the outwardly extending members 130. Additionally, locking pins 136 further lock the arms 132 with respect to the outwardly extending members 130.

A pivot bracket assembly 140 mounts a support surface 138 to the arms 132. The bracket assembly 140 has a pair of first support plates 142 mounted to the support surface 138. The plates 142 are space from one another and as illustrated are mounted to the side tubes 144 of the support surface 138. Each plate 142 is pivotally mounted to frame mount brackets 146. A pin 148 allows the plate 142 to pivot with respect to the brackets 146. Each of the brackets 146 have a distal end that has a hook 150 to receive a spring biased latch 152 mounted to the plates 142. The latch 152 is controlled by a handle 154 to allow the latch 152 to be unlatched from the hook 150 when the support surface 138 is rotated from the transport position shown in FIG. 11 to the working position shown in FIG. 10.

For structural strength, the support surface 138 has a closed end 156 and mounted to the opposite end is a retainer 158 to retain the panel on the support surface during transport.

A support stand or leg 160 is pivotally mounted to the frame 128 to support the panel carrier 120 when in the working position. A support stand bracket 164 mounts the support stand 160 to the frame 128. A pin 162 connects the support stand 160 to the bracket 164 to allow the support stand 160 to pivot with respect to the frame 128. A locking pin 166 engages a locking slot 168 to retain the support stand 160 in the transport position, shown in FIG. 11, or the working position shown in FIG. 10.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed is:

1. A panel carrier comprising:
   a frame including a base and at least one outwardly extending member;
   a support leg pivotally mounted to said frame and having a lower end spaced from said frame and with said support leg being movable between a first position and a second position with said support leg being generally parallel and adjacent said frame and said lower end of said support leg being coplanar with said base in said first position and said support leg being angled with respect to said frame in said second position;
   a support surface having a retainer disposed at one end of said support surface for receiving a panel,
   said support surface being pivotally mounted to said frame and movable between a transport position and a working position with said support surface being generally parallel and adjacent said frame and said one end of said support leg including said retainer being coplanar with said base and said lower end in said transport position and said support surface being generally perpendicular to said frame in said working position;
   a pair of support plates spaced from one another and mounted to said support surface,
   a pair of frame mount brackets spaced from one another and extending from said frame and pivotaly connected to said support plates to pivotally connect said support plates to said frame and allow said support surface to pivot with respect to said frame,
   a pair of spring biased latches attached to respective ones of said support plates to engage said frame mount brackets for locking said support surface in said working position, a handle extending between and connecting said spring biased latches to each other to release said spring biased latches from engaging said frame mount brackets in said work position for allowing said support surface to rotate about said frame from said working position to said transport position, and at least one wheel rotatably mounted to said base of said frame and parallel to said base whereby said at least one wheel is disposed between said base and said retainer and parallel to said retainer and said lower end of said support leg in said transport position.

2. The panel carrier of claim 1, wherein said at least one wheel includes two wheels mounted to said base of said frame spaced from one another to facilitate movement of said panel carrier.

3. The panel carrier of claim 1, wherein said at least one outwardly extending member includes two outwardly extending members spaced apart from one another and extending from said base.

4. The panel carrier of claim 1, further including at least one support arm, said support arm interconnecting said support surface with said frame.

5. The panel carrier of claim 4, wherein said at least one support arm is telescopically received within said frame to allow relative adjustment of said support surface with respect to said frame.

6. The panel carrier of claim 5, further including a locking member adapted to lock said support arm with respect to said frame at pre-determined positions.

7. The panel carrier of claim 3, further including two support arms, said support arms interconnecting said support surface with said frame, said support arms are telescopically received within said two spaced apart outwardly extending members of said frame to allow relative adjustment of said support surface with respect to said frame.

8. The panel carrier of claim 7, further including a locking member adapted to lock said support arms with respect to said two spaced apart outwardly extending members of said frame at pre-determined positions.

9. The panel carrier of claim 1, further including a pin pivotally interconnecting said support plates and said frame mount brackets.

10. The panel carrier of claim 1, wherein said support surface is defined by spaced apart support members.

11. A panel carrier comprising:
a frame including a base and at least one outwardly extending member;
a support leg having pivotally mounted to said frame and having a lower end spaced from said frame with said support leg being movable between a first position and a second position with said support leg being generally parallel and adjacent said frame and said lower end of said support leg being coplanar with said base in said first position and said support leg being angled with respect to said frame in said second position;
a support surface having a retainer disposed at one end of said support surface for receiving a panel;
said support surface being pivotally mounted to said frame and movable between a transport position and a working position with said support surface being generally parallel and adjacent said frame and said one end of said support surface including said retainer being coplanar with said base and said lower end in said transport position and said support surface being generally perpendicular to said frame in said working position;
said frame including at least one support arm telescopically received by said outwardly extending member;
a pair of support plates spaced from one another and mounted to said support surface,
a pair of frame mount brackets spaced from one another and extending from said frame and pivotaly connected to said support plates to pivotally connect said support plates to said frame and allow said support surface to pivot with respect to said frame,
a pair of spring biased latches attached to respective ones of said support plates to engage said frame mount brackets for locking said support surface in said working position,
a handle extending between and connecting said spring biased latches to each other to release said spring biased latches from engaging said frame mount brackets in said work position for allowing said support surface to rotate about said frame from said working position to said transport position, and
at least one wheel rotatably mounted to said base of said frame and parallel to said base whereby said at least one wheel is disposed between said base and said retainer and parallel to said retainer and said lower end of said support leg in said transport position.

12. The panel carrier of claim 11, wherein said at least one wheel includes two wheels mounted to said base of said frame spaced from one another to facilitate movement of said panel carrier.

13. The panel carrier of claim 11, wherein said at least one support arm is telescopically received within said outwardly extending member to allow relative adjustment of said support surface with respect to said frame.

14. The panel carrier of claim 13, further including a locking member adapted to lock said support arm with respect to said frame at pre-determined positions.

15. The panel carrier of claim 11, further including two support arms, and said at least one outwardly extending member including two outwardly extending members spaced apart from one another and extending outwardly from said base, said support arms interconnecting said support surface with said frame, said support arms are telescopically received within said two spaced apart outwardly extending members of said frame to allow relative adjustment of said support surface with respect to said frame.

* * * * *